US006575409B1

(12) United States Patent
West

(10) Patent No.: US 6,575,409 B1
(45) Date of Patent: Jun. 10, 2003

(54) FLUOROLUMINESCENT LIGHTED KITE

(76) Inventor: Jason West, Rt. 2, Box 203-C, Zavalla, TX (US) 75980

( * ) Notice: Subject to any disclaimer, the term of this patent is extended or adjusted under 35 U.S.C. 154(b) by 0 days.

(21) Appl. No.: 10/172,437

(22) Filed: Jun. 17, 2002

(51) Int. Cl.[7] .......................... A63H 27/08; B64C 31/06
(52) U.S. Cl. ..................... 244/153 R; 362/470; 362/84; 446/34
(58) Field of Search ......................... 244/153 R, 155 R; 362/470, 84; 446/34

(56) References Cited

U.S. PATENT DOCUMENTS

| | | | | |
|---|---|---|---|---|
| 3,768,908 A | * | 10/1973 | Zaromb | 356/338 |
| 4,715,564 A | | 12/1987 | Kinn | 244/153 R |
| 5,000,402 A | | 3/1991 | Blackburn | 244/153 R |
| 5,018,056 A | | 5/1991 | Hou | 362/253 |
| 5,098,039 A | | 3/1992 | Linden, Jr. | 244/153 R |
| 5,537,486 A | * | 7/1996 | Stratigos et al. | 382/137 |
| 5,711,595 A | * | 1/1998 | Gerbe | 362/84 |
| 5,830,034 A | | 11/1998 | Ciechanowski | 446/219 |
| 6,168,115 B1 | | 1/2001 | Abdelkhaleq | 244/155 R |
| 6,283,414 B1 | | 9/2001 | Quinones | 244/155 R |

* cited by examiner

*Primary Examiner*—J. Woodrow Eldred
(74) *Attorney, Agent, or Firm*—Randal D. Homburg

(57) ABSTRACT

The invention is a kite intended for use at night which is provided with a battery operated power supply activating one or more black lights directed to the front surface of the kite, the black light causing a fluoroluminescent display on the front surface of the kite to be illuminated, while the rest of the front surface, being a non-luminescent material of coating, shows only the fluoroluminescent display causing such display to appear to be flying without being able to see the kite.

2 Claims, 2 Drawing Sheets

FLUOROLUMINESCENT LIGHTED KITE

CROSS REFERENCE TO RELATED APPLICATIONS

None

I. BACKGROUND OF THE INVENTION

1. Field of Invention

The invention is a kite intended for use at night which is provided with a battery operated power supply activating one or more black lights directed to the front surface of the kite, the black light causing a fluoroluminescent display on the front surface of the kite to be illuminated, while the rest of the front surface, being a non-luminescent material of coating, shows only the fluoroluminescent display causing such display to appear to be flying without being able to see the kite.

2. Description of Prior Art

The following United States patents were discovered and are disclosed within this application for utility patent. All relate to illuminated kites or glow-in-the-dark kites.

Four U.S. Patents disclose lighted kite systems utilizing conventional light bulbs which illuminate the kite with white light, or visible light, merely illuminating the kite, displaying the entire kite surface. See U.S. Pat. No. 5,000,402 to Blackburn, U.S. Pat. No. 5,098,039 to Linden, Jr., U.S. Pat. No. 6,168,115 to Abdelkhaleq, and U.S. Pat. No. 6,283,414 to Quinones. In U.S. Pat. No. 5,018,056 to Hou, the kite contains a plurality of LEDs on the front surface to display a light dot image on the front of the kite. A chemiluminescent flexible light source is used in U.S. Pat. No. 4,715,564 to Kinn, the light created by a mixture of two chemicals producing the visible light illuminated through the clear flexible outer tube. However, none of these patents utilize a combination of a black light and fluoroluminescent images to display only the image at night without illumination of the non-luminescent material on the remainder of the kite.

II. SUMMARY OF THE INVENTION

The primary objective of the invention is to provide a kite having a black light system to illuminate a fluoroluminescent material or paint on a front surface of a kite to display only the fluoroluminescent material or paint while flying the kite at night.

III. DESCRIPTION OF THE DRAWINGS

The following drawings are submitted with this utility patent application.

IV. DESCRIPTION OF THE PREFERRED EMBODIMENT

Figure 1:
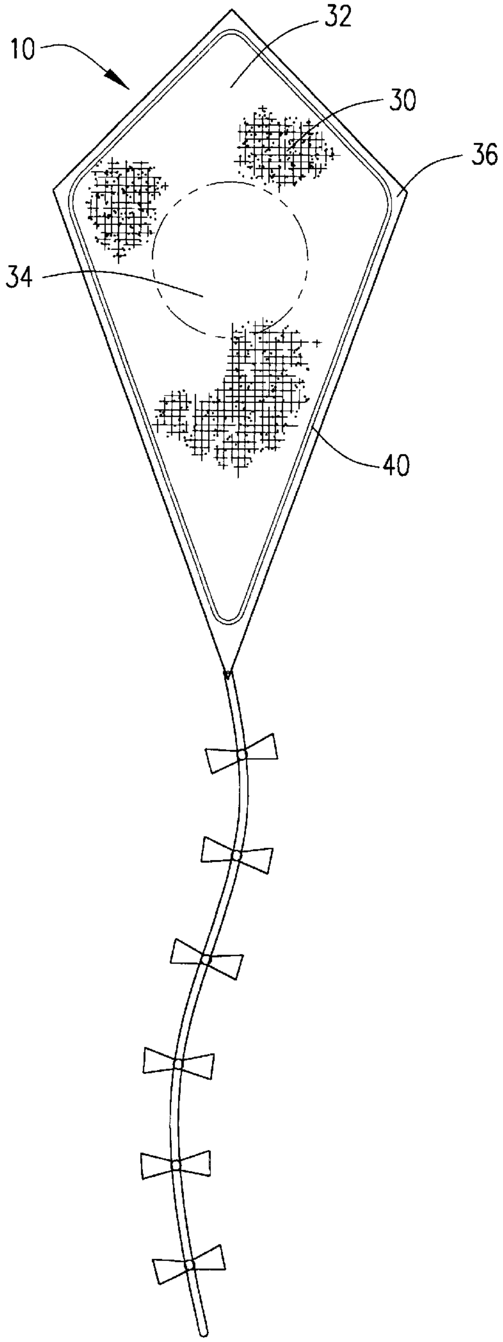
FIG. 1 is a drawing of the front of the kite.
Figure 2:
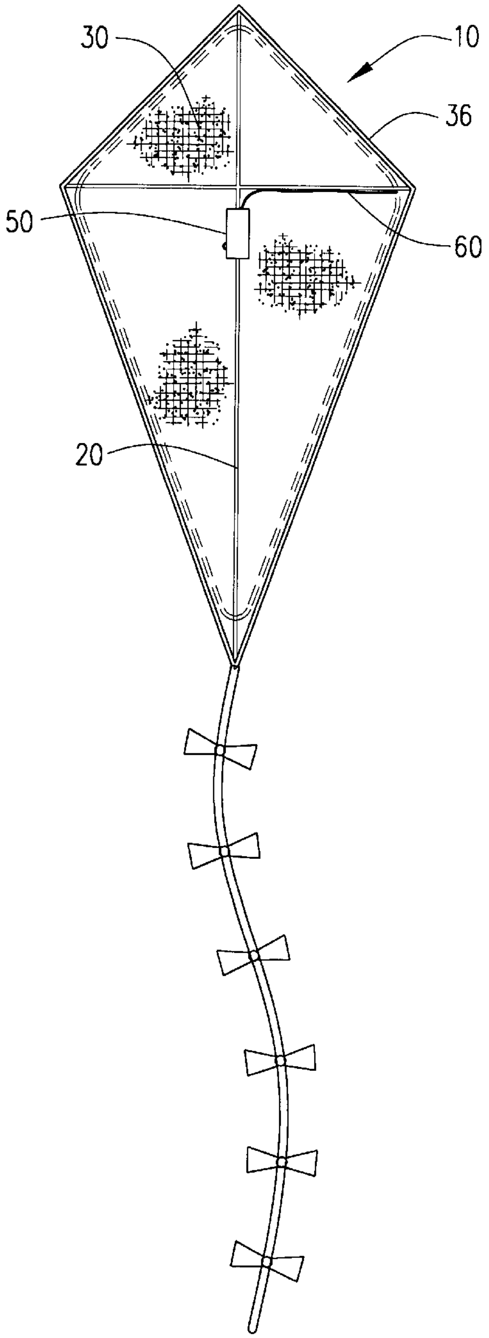
FIG. 2 is a drawing of the back of the kite.
Figure 3:
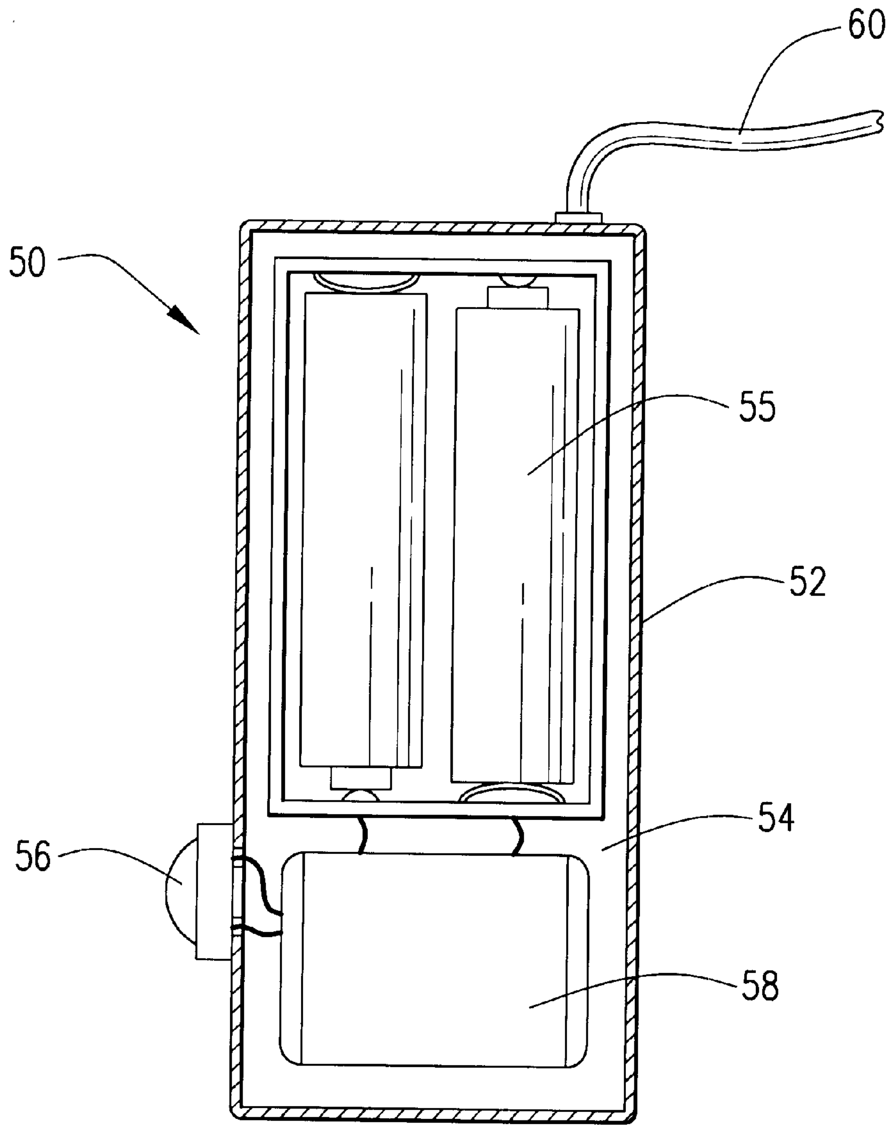
FIG. 3 is a drawing of a cross section of the power supply.

The invention, as shown in FIGS. 1–3 of the drawings, is a fluoroluminescent kite 10 intended for flight at night, the kite 10 comprising a kite frame 20 to which is attached a light-weight fabric cover 30, the cover 30 having a front surface 32 upon which is placed a fluoroluminescent image 34, the front surface 32 illuminated by at least one ultraviolet light source 40 directed to the fluoroluminescent image 34, illuminating the fluoroluminescent image 34 without illuminating the remainder of the front surface 32 of the kite 10, the ultraviolet light source 40 powered by a battery power supply 50 attached to the kite frame 20, connected to the ultraviolet light source 40 by a wire 60.

The fluoroluminescent image 34 may include any number of designs or symbols which are not germane to the kite. However, the fluoroluminescent image 34 must be a material or substance which is reactive to the ultraviolet light source 40 and must react by glowing when exposed to such ultraviolet light source 40. The ultraviolet light source 40, commonly referred to as "black light", may derive from a single source or may be a combination of several sources around a perimeter 36 of the front surface 32 of the kite 10.

The battery power supply 50, as shown in FIGS. 2 and 3 of the drawings, includes an outer housing 52 having an inner cavity 54 within which is located a dry cell power source 55, indicated in the drawings as at least one battery, a power switch 56, and a ballast 58 supplying the ultraviolet light source 40 with a steady electrical current required to cause the ultraviolet light source 40 to illuminate.

When the ultraviolet light source 40 is illuminated in the dark, only the fluoroluminescent image 34 on the front surface 32 of the kite 10 should be illuminated, making the kite 10 have the appearance of the fluoroluminescent image 34 flying alone in the sky at night. Preferably, the ultraviolet light source 40 and the other choices of materials utilized in the kite 10 would withstand potential multiple impacts from the kite 10 either bumping into objects while in flight or the impact of the kite 10 falling to the ground at landing.

While the invention has been particularly shown and described with reference to a preferred embodiment thereof, it will be understood by those skilled in the art that changes in form and detail may be made therein without departing from the spirit and scope of the invention.

What is claimed is:

1. A fluoroluminescent kite for flying at night, the kite comprising:

a kite frame to which is attached;

a light-weight fabric cover, the cover having a front surface upon which is placed a fluoroluminescent image, the front surface illuminated by;

at least one ultraviolet light source directed to the fluoroluminescent image without illuminating the remainder fo the front surface of the kite, the ultraviolet light source powered by a battery power supply attached to the kite frame, connected to the ultraviolet light by a wire, the fluoroluminescent image reactive to ultraviolet light causing such fluoroluminescent image to glow when exposed to such ultraviolet light.

2. The kite, as disclosed in claim 1, with the battery power supply further comprising an outer housing having an inner cavity within which is located a dry cell power source, indicated in the drawings as at least one battery, a power switch, and a ballast supplying the ultraviolet light with an electrical current required to cause the ultraviolet light to illuminate.

* * * * *